United States Patent [19]

Reed

[11] Patent Number: 5,027,930
[45] Date of Patent: Jul. 2, 1991

[54] COASTER BRAKE ASSEMBLY

[75] Inventor: Brent E. Reed, Palmdale, Calif.

[73] Assignee: Hess-Reed Partners, Camarillo, Calif.

[21] Appl. No.: 299,645

[22] Filed: Jan. 23, 1989

[51] Int. Cl.⁵ .................... F16D 41/24; B62L 5/00
[52] U.S. Cl. ..................... 192/6 R; 188/24.17
[58] Field of Search ............. 188/24.17, 26; 192/5, 192/6 R, 12 BA, 14

[56] References Cited

U.S. PATENT DOCUMENTS

| 646,431 | 3/1900 | Hauger . | |
|---|---|---|---|
| 1,397,174 | 11/1921 | Morwood | 280/282 |
| 1,408,842 | 3/1922 | Svenson . | |
| 1,497,729 | 6/1924 | McGrath . | |
| 1,556,256 | 10/1925 | Simmons . | |
| 2,091,586 | 8/1937 | Glacy . | |
| 2,113,177 | 5/1938 | Glacy . | |
| 2,138,497 | 11/1938 | Mackowiak | 192/6 R |
| 2,246,191 | 6/1941 | Schmitz . | |
| 2,489,964 | 11/1949 | Hood | 192/6 R |
| 2,528,309 | 10/1950 | Hood | 192/6 R |
| 2,764,270 | 9/1956 | Goul | 192/6 |
| 3,252,551 | 5/1966 | Hood . | |
| 3,927,743 | 12/1975 | Tsuchiye | 192/6 R |
| 4,143,747 | 3/1979 | Langieri, Jr. et al. | 192/6 B |
| 4,269,291 | 5/1981 | Almond | 192/6 R |
| 4,330,914 | 5/1982 | Hood | 29/159.01 |

OTHER PUBLICATIONS

Sutherland's Handbook for Bicycle Mehcanics: 1985; pp. 7-10, 7-15, 7-15a, 7-15b, 7-16.

Primary Examiner—Robert J. Oberleitner
Attorney, Agent, or Firm—Spensley Horn Jubas & Lubitz

[57] ABSTRACT

A coaster brake assembly which is coupled directly to a drive shaft. The drive shaft has a threaded driver integral thereon. A clutch cone having internal threads traverses in axial directions as it threads on or off the driver depending on the rotation of the driver. A brake cone is provided which has a smooth axial bore through which the drive shaft rotates. The axial movement of the clutch cone toward the brake cone operates to force brake shoes against the inside wall of the hub. A spring is provided to facilitate threading action between the clutch cone and the driver.

5 Claims, 11 Drawing Sheets

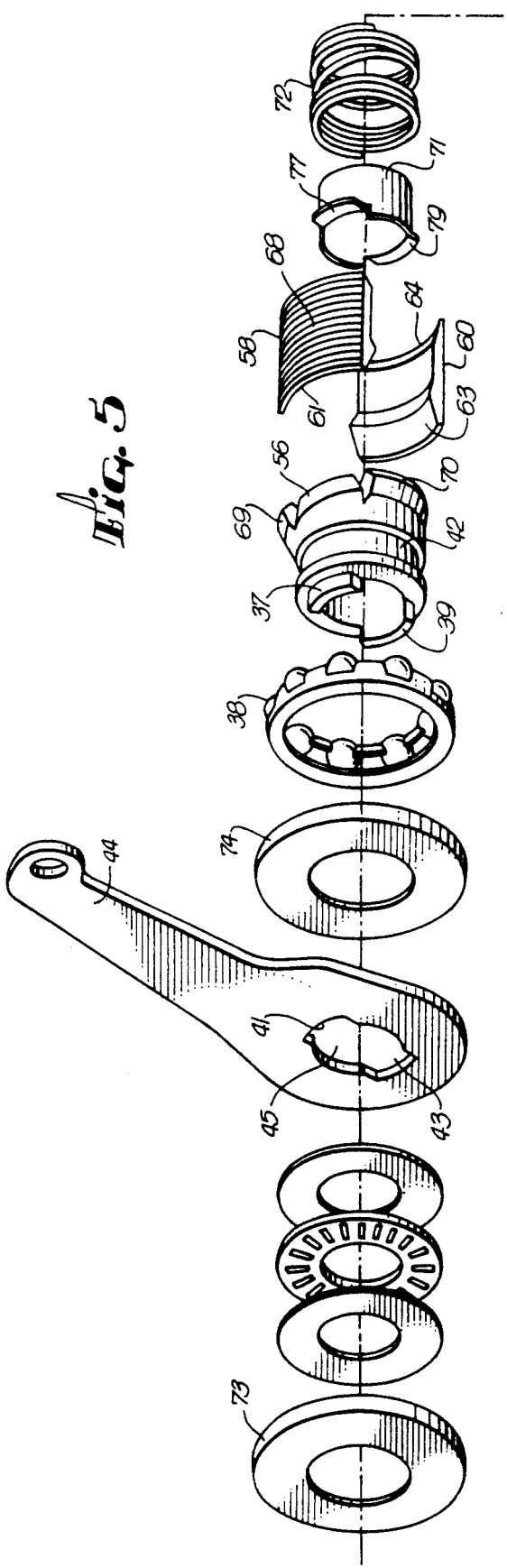
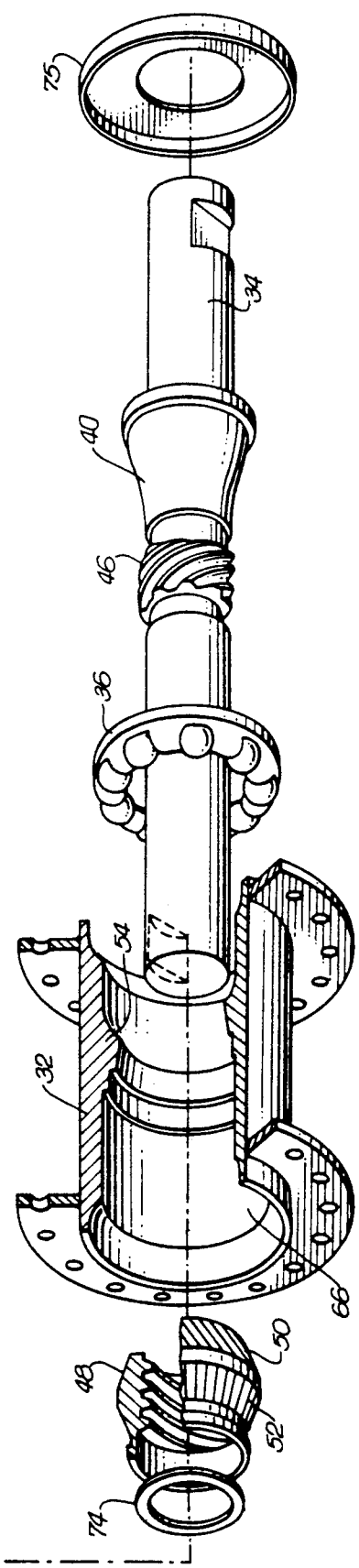
Fig. 5

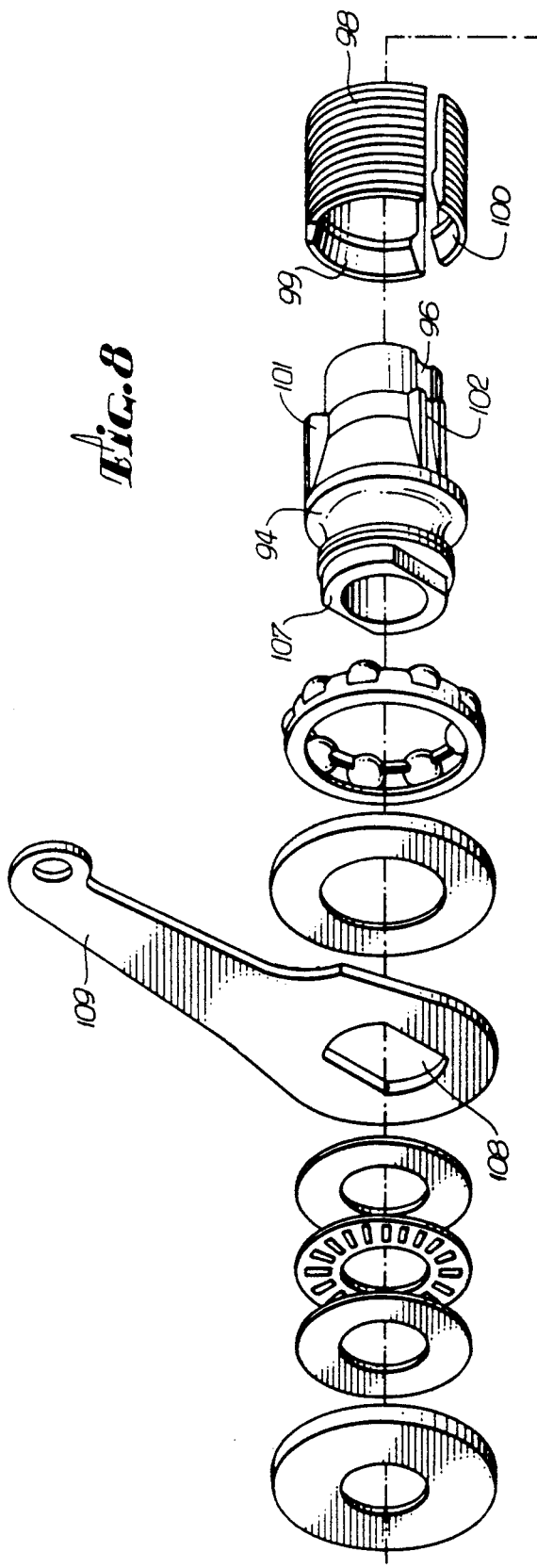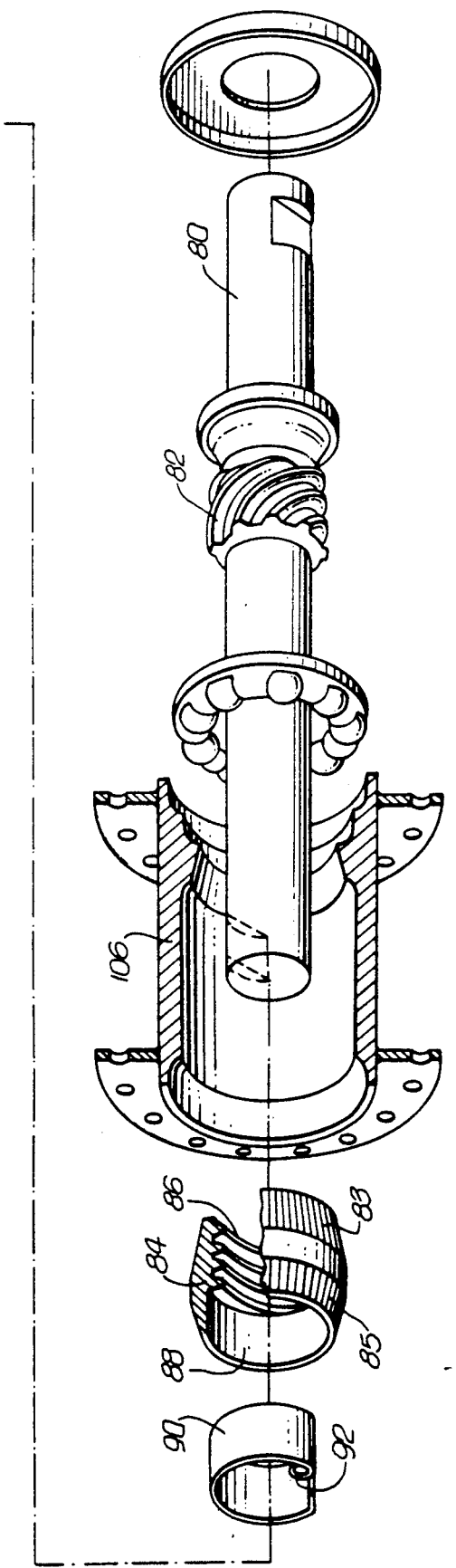
FIG. 8

COASTER BRAKE ASSEMBLY

BACKGROUND OF THE INVENTION

1. Field of the Invention

The present invention relates to coaster brakes and more particularly to coaster brakes adapted for use on the front wheel of a tricycle or velocipede.

2. Description of Related Art

Coaster brakes are most commonly installed in the hub of the rear wheel of a bicycle which rotates about a fixed axle. Another type of coaster brake is installed in the hub of the front wheel of tricycles or velocipedes, which is directly driven by a drive shaft on which the hub is mounted. The shaft is rotated by turning crank arms connected to the ends of the drive shaft U.S. Pat. No. 1,408,842 to Charles W. Svenson and U.S. Pat. No. 2,528,309 to Edwin E. Hood describe such coaster brakes.

The operational characteristics of this type of coaster brake is that forward rotation of the shaft (i.e., in a direction which causes the velocipede to travel forward) causes the wheel to rotate in the same direction; reverse rotation of the shaft operates the braking mechanism of the coaster brake assembly to retard the forward rotation of the wheel. In the absence of rotation of the shaft, the wheel rotates freely under its inertia independent of the shaft.

It is believed that the coaster brakes described in the Svenson and Hood patent have not met with commercial acceptance. Other coaster brakes such as those marketed by Shimano, Suntour and Bendix, while commercially successful, have generally required fixed axles and were typically used for rear wheel drive bicycles.

SUMMARY OF THE INVENTION

The present invention is directed to a coaster brake assembly adapted for use on a velocipede of the type in which the front wheel is mounted on a drive shaft to which driving force is directly applied by crank arms. The components of the coaster brake assembly is assembled inside the hub of the wheel and around the shaft. The shaft is provided with a threaded driver integral to the shaft which cooperatively engages an adjacent clutch cone. The clutch cone is generally cylindrical and is provided with an internally threaded end adjacent the driver and a tapered end having a tapered surface. A brake cone having a tapered end and a smooth axial bore is provided through which the shaft rotates. The brake cone is fixed from rotation. Brake shoes having tapered ends are provided in the space defined by the clutch cone, the lake cone and the inside wall of the hub. The tapered surfaces of the brake cone and the clutch cone are adapted to engage the tapered surfaces of brake shoes to create a camming action for applying the brake shoes to the inside surface of the hub during braking operation.

In operation, forward pedaling of the drive shaft causes the clutch cone to be threaded onto the driver thereby causing the clutch cone to traverse toward the driver. At the same time, the brake shoes disengage from the inside wall of the hub. The clutch cone frictionally engages an internal flange of the hub thereby coupling the hub to the shaft so as to cause the hub to rotate along with the driver and the clutch cone. When pedaling is ceased or slowed, the clutch cone unthreads slightly from the driver and traverses away from the internal flange of the hub. The hub is thus decoupled from the shaft and is allowed to rotate independently of the shaft. Upon reverse pedaling, the clutch cone further unthreads from the driver and urges toward the brake cone. The tapered surfaces of the clutch cone and the brake cone engage the tapered surfaces of the brake shoes. The brake shoes are caused to move radially outward as a result of the camming action between the tapered surfaces. The hub is thus prevented from rotation as the brake shoes frictionally engages the inside surface of the hub.

To facilitate threading action between the clutch cone and the driver, a helical spring is provided between the brake cone and the clutch cone for urging the clutch cone toward the driver and for providing rotational resistance to the clutch cone so as to prevent rotary motion of the clutch cone during threading with respect to the rotating driver. In another embodiment, the brake cone extends into the clutch cone and a cylindrical C-shaped spring is fitted between the extended portion of the brake cone and the clutch cone. In yet another embodiment, the clutch cone is made up of two cone sections coupled by a split sleeve.

To couple the rotation of the drive shaft and the hub in the forward driving direction, instead of clutching a clutch cone against an internal flange of the hub, a unidirectional bearing or ratchet mechanism x-ray be used to couple the rotation of the shaft and hub in the forward driving direction.

BRIEF DESCRIPTION OF THE DRAWINGS

The invention will be described with reference to the accompanying drawings.

FIG. 5 is an exploded perspective view of the components of the coaster brake assembly of FIG. 3.

FIG. 8 is an exploded perspective view of the components of the coaster brake assembly of FIG. 6.

DESCRIPTION OF THE ILLUSTRATED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
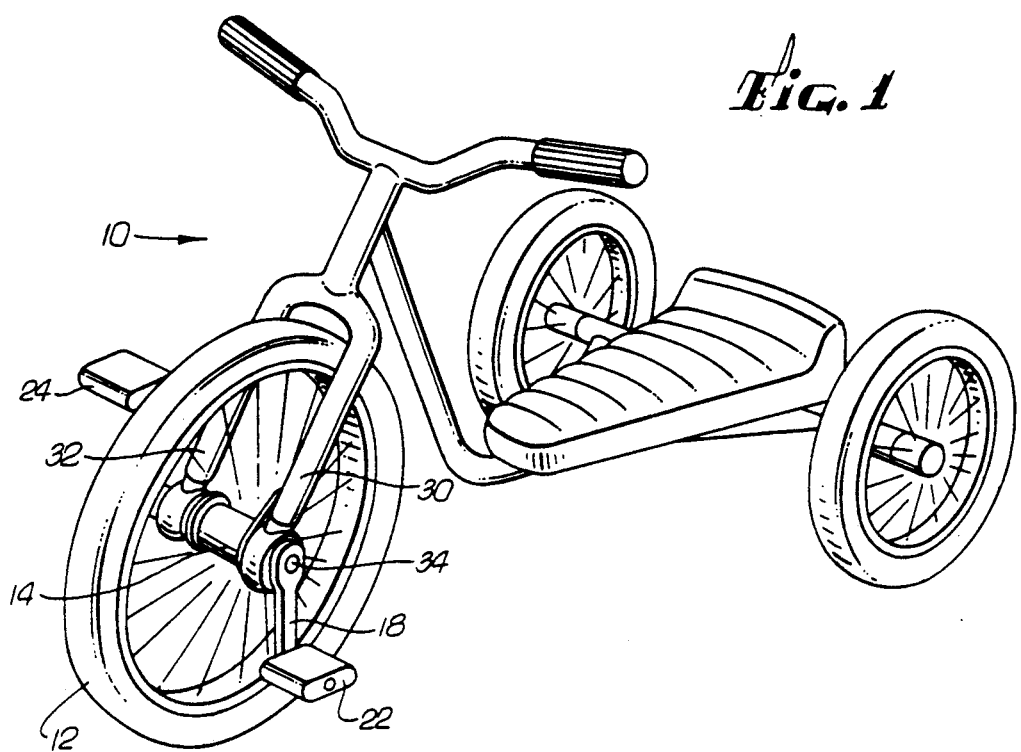
FIG. 1 is a perspective view of a velocipede on which the coaster brake of the present invention is installed in the hub of the front wheel.

Referring to FIG. 1, a velocipede 10 is shown which is of the type propelled by directly driving a front wheel 12. Hub 14 of the front wheel is mounted on a shaft 34 of which the ends are connected to crank arms 18 and 20 which are provided with pedals 22 and 24. This is more clearly shown in FIG. 2. The shaft 34 is mounted on bearings 26 and 28 which are supported by front forks 30 and 32.

The coaster brake assembly according to the present invention is assembled within the hub 14. The general operation of the velocipede is as follows. When the crank arms 18 and 20 are turned in a direction shown by arrow 'A' in FIG. 2, the shaft 34 rotates to drive the wheel 12 in the same direction, thereby driving the velocipede 10 forward. When the crank arms 18 and 20 rotate at a slower speed relative to the hub or cease rotation, i.e., are stationary with respect to the forks 30 and 32, the hub 14 continues to rotate about the shaft which is now stationary. The velocipede is now coasting under its own inertia. When the crank arms 18 and 20 are turned in the reverse directions, the components of the coaster brake assembly within the hub 14 operate to slow or to brake the wheel 12 from further rotation.

Figure 2:
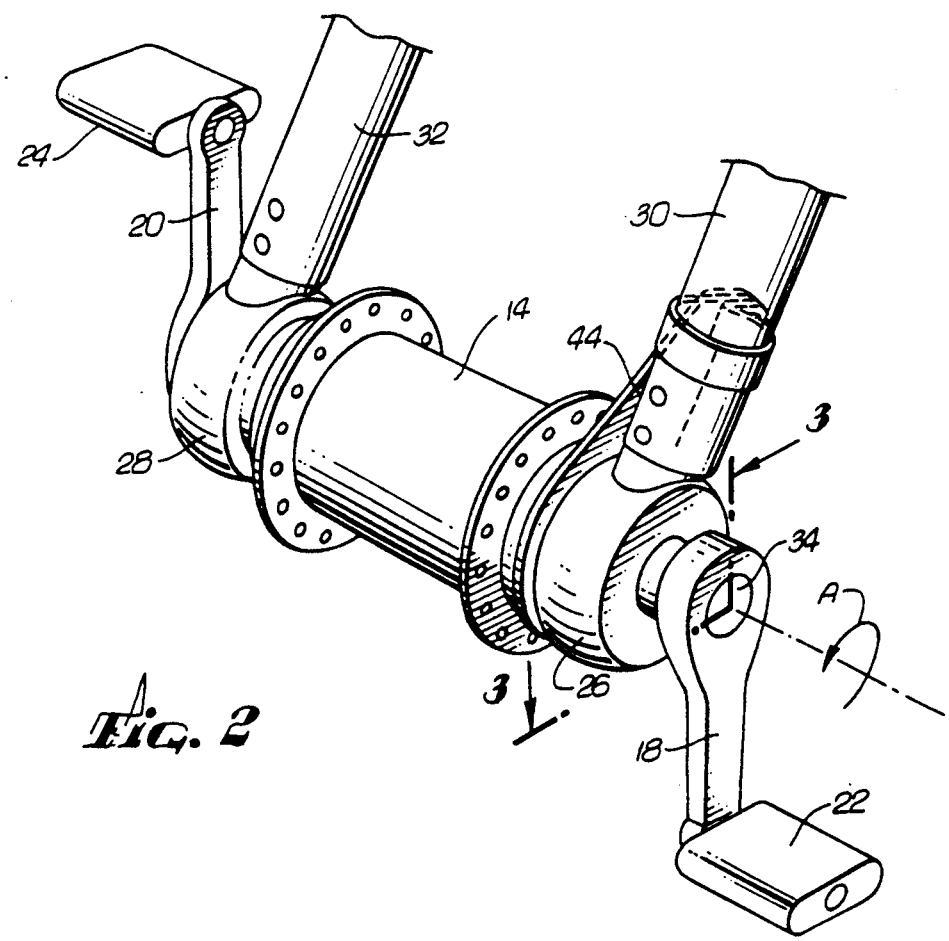
FIG. 2 is an enlarged perspective view of the front hub region of the velocipede of FIG. 1.

As shown in FIG. 2, a brake reaction lever 44 is provided at one end of the hub 14 and connected to one of the forks 30 for proper operation of the coaster brake. This will be described in detail later.

Figure 3:
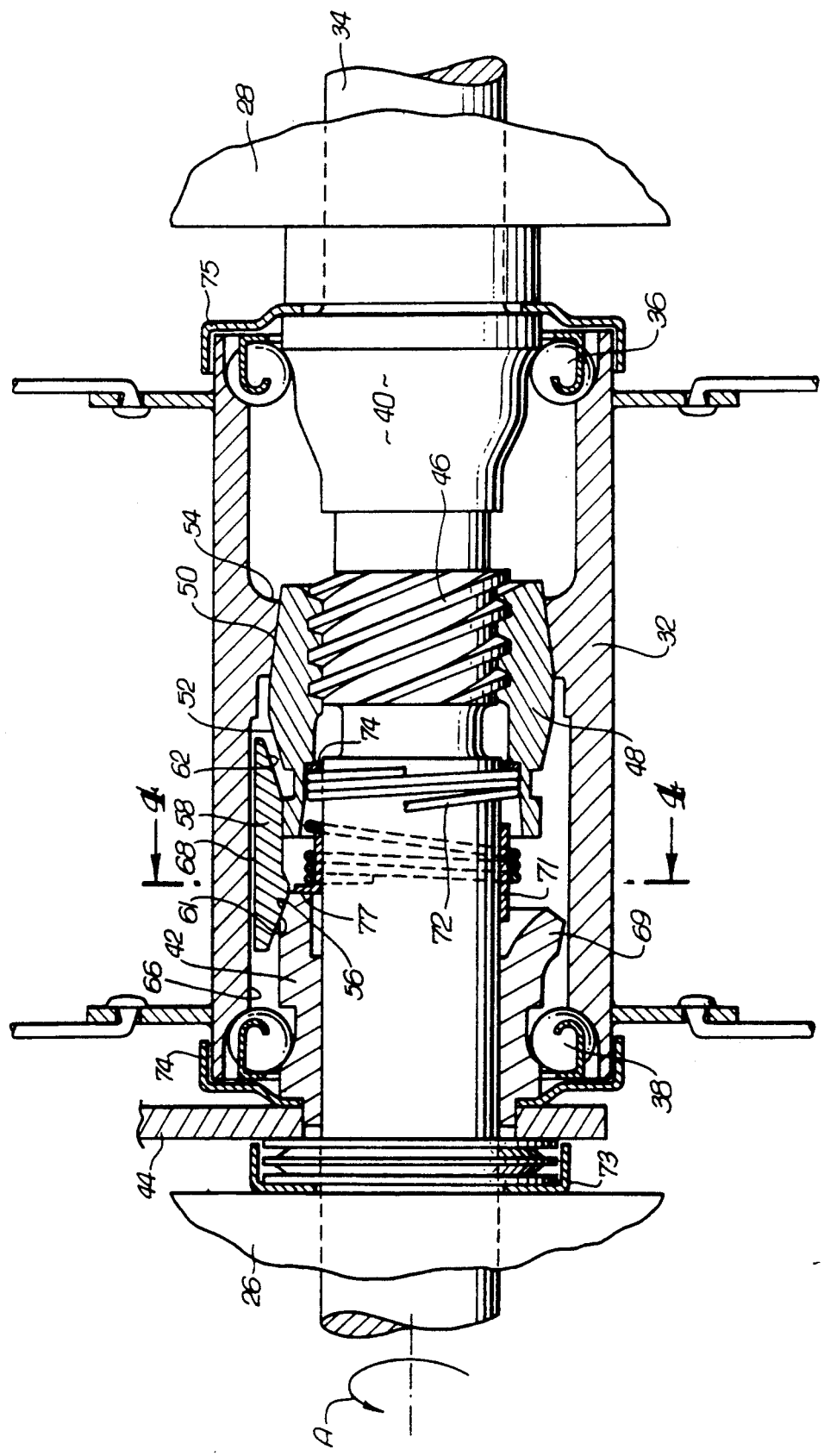
FIG. 3 is a sectional view of the front hub a first embodiment of a coaster brake assembly of the present invention.
Figure 4:
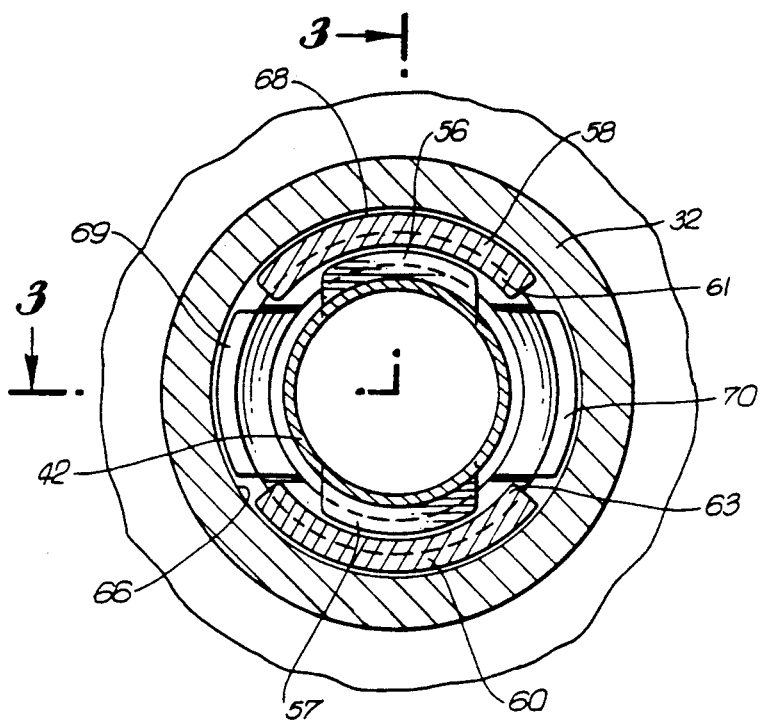
FIG. 4 is a cross-sectional view of the coaster brake assembly of FIG. 3.

Referring to FIGS. 3-5, a first preferred embodiment of the present invention will be described. A hub 32 having a cylindrical wall is rotatably mounted on a shaft 34 which is supported by bearings 26 and 28 attached to the front forks of the velocipede. At one end of the hub, a bearing 36 is provided between the hub 32 and an enlarged portion 40 of the shaft. At the other end of the hub 32, a bearing 38 is provided between a brake cone 42 and the hub 32. The brake cone has a smooth axial bore through which the shaft 34 is free to rotate. Bearings such as needle bearings, lubri-slip plating, bushings and heat treated surfaces may be provided to facilitate free rotation of the shaft within the brake cone.

The brake cone 42 is provided with alternating tapered surfaces 56 and 57 (FIG. 4) and lugs 69 and 70 at one end. The other end of the brake cone 42 is coupled to a brake reaction lever 44 which is secured to the chassis of the velocipede. Referring to FIG. 5, lugs 37 and 39 of the brake cone 42 fit into cutouts 41 and 43 around a circular shaft hole 45 of the lever 44 through which the shaft 34 passes. The lever 44 secured to the velocipede frame prevents the brake cone 42 from rotary movement.

The shaft 34 has a portion 46 (hereinafter referred to as a driver) integral thereto which is provided with a helical thread. Slidably mounted along the shaft 34 and adjacent the driver 46 is a clutch cone 48 which is provided with an internal threaded surface for threading engagement with the driver 46. The direction of the thread is such that when the shaft 34 is rotated in the direction of arrow 'A' (FIG. 2), the clutch cone 48 is threaded onto the driver 46. The clutch cone 48 is generally cylindrical having tapered surfaces 50 and 52. The tapered surface 50 is adapted to frictionally engage a flange 54 on the internal cylindrical wall of the hub 32 for coupling the rotation of the shaft 34 to the hub to drive the wheel forward. The tapered surface 50 may be roughened to increase friction between the clutch cone 48 and the flange 54.

A pair of brake shoes 58 and 60 having tapered surfaces 61, 62, 63 and 64 are disposed circumferentially about the space defined between the tapered surfaces 56 and 57 of the brake cone 42, the tapered surface 52 of the clutch cone 48 and the inside wall 66 of the hub 32. Each of the brake shoes is provided with a convex surface 68 adapted to engage the inside wall 66 of the hub for braking. The tapered surfaces 62 and 64 of the brake shoes 58 and 60 are adapted to engage the tapered surface 52 of the clutch cone and the tapered surfaces 61 and 63 of the brake shoes are adapted to engage the tapered surfaces 56 and 57 of the brake cone 42. The relative axial positions of the clutch cone 48 and the brake cone 42 cause the brake shoe tapered surfaces to slide along the corresponding tapered surfaces of the clutch cone and the brake cone, thereby creating a camming action to force the brake shoes outward to the inside wall of the hub 32. Referring to FIG. 4, the lugs 69 and 70 on the brake cone 42 separate the brake shoes 58 and 60 and define their circumferential position. The tapered surfaces 61 and 63 on the brake shoes rest on the corresponding tapered surfaces 56 and 57 and between the lugs 69 and 70 on the brake cone 42.

A helical spring 72 is disposed along the shaft 34 and between the clutch cone 48 and the brake cone 42. The spring 72 is fitted over a cylindrical retainer 71 which has tabs 77 and 79 provided at its end adjacent to the brake cone 42. The tabs 77 and 79 fit between the brake cone lugs 69 and 70. Since the brake cone is prevented from rotary motion, so is the retainer 71 coupled thereto. Consequently the end of the spring press fit over the retainer 71 is similarly restrained. A washer 74 is provided between the clutch cone 48 and the spring 72 for proper seating of the spring against the clutch cone and to allow the other end of the spring to slip inside the clutch cone as the clutch cone rotates in the forward direction.

The spring 72 urges the clutch cone 48 toward the driver and applies rotational resistance to the clutch cone 48 to retard the clutch cone from rotary motion while it threads on or off the driver as the shaft 34 rotates, thereby facilitating the threading action of the clutch cone 48 with respect to the driver 46. The spring 72 however allows the clutch cone 48 to rotate slightly against the torsion of the spring. This will insure that the clutch cone 48 will be disengaged from the flange 54 during coasting as explained below.

The components of the coaster brake assembly within the hub 32 are protected from dust by dust caps 74 and 75 provided at the ends of the hub 32. Miscellaneous spacing components such as washers and thrust bearings (not numbered in the figures) are provided between the lever 44 and the bearing 36.

In the operation of the coaster brake of the aforedescribed embodiment of the invention, rotation of the shaft 34 by the crank arms in the forward driving direction as indicated by arrow 'A' causes the clutch cone 48 which is biased against rotation by the spring 72 to thread itself onto the threads of the driver 46. The spring 72 facilitates the threading action as it urges the clutch cone 48 toward the driver 46 and deters the clutch cone from rotating with the rotating driver 46. The clutch cone 48 thus traverses axially toward the flange 54, and frictionally engages the flange 54 thereby coupling the rotary motion of the shaft 34 to the hub 32 so as to drive the hub 32 to rotate in the same direction as the shaft 34. FIG. 3 shows the clutch cone 48 in the forward driving position where the brake shoes are disengaged from the inside wall 66 of the hub 32.

When the rotation of the shaft 34 is stopped or slowed, the hub 32 continues to rotate in the forward driving direction as indicated by the arrow 'A' (FIG. 2) as a result of its inertia and the inertia of the velocipede. Friction between the tapered surface 50 and flange 54 causes the clutch cone 48 to rotate slightly with respect to the slowed or stopped shaft 34. The helical spring 72 is consequently unwound slightly to accommodate this slight rotary motion of the clutch cone. This in turn causes the clutch cone to unthread slightly from the driver 46 thereby disengaging the clutch cone 48 from the flange 54. The hub 32 is now decoupled from the shaft 34 and it will continue to rotate independently of the shaft 34, i.e., coast. The spring 72 continues to urge against the clutch cone 48 to prevent the clutch cone 48 from being unthreaded further from the driver 46 which will otherwise bind the brake shoes as will be explained below. If the shaft 34 were to resume or increase forward rotation, the spring 72 which is under torsion will rewind slightly to rotate the clutch cone slightly to engage the flange 54.

To brake or slow the rotation of the hub 32, the shaft 34 is rotated in a reverse direction to arrow 'A'. This causes the clutch cone 48 which is held from rotation by the binding action of the slightly unwound spring 72 to unthread further from the driver 46 against the urging of the spring 72 and traverse toward the brake cone 42. The corresponding tapered surfaces 61 to 64 of the brake shoes engage the brake cone tapered surfaces 56 and 57 and clutch cone tapered surface 52. This creates a camming action between the brake shoes and the brake and clutch cones, thus causing the brake shoes 58 and 60 to move radially outward toward the inside wall of the hub 32. The convex surfaces 68 of the brake shoes frictionally engage the inside wall 66 of the hub 32 thereby to retard and finally stop the rotation of the hub 32. It can be seen that by means of the lever 44, the brake cone 42 is prevented from rotating along with the hub 32 after the brake shoes made contact with the hub 32. The lugs 69 and 70 on the brake cone 42 in turn prevent the brake shoes from rotation.

Figure 7:
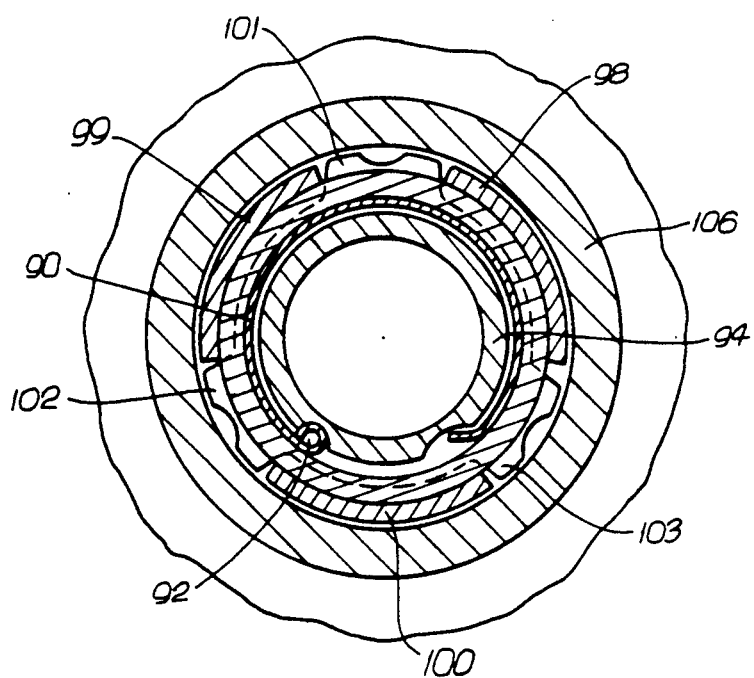
FIG. 7 is a cross-sectional view of the coaster brake assembly of FIG. 6.
Figure 6:
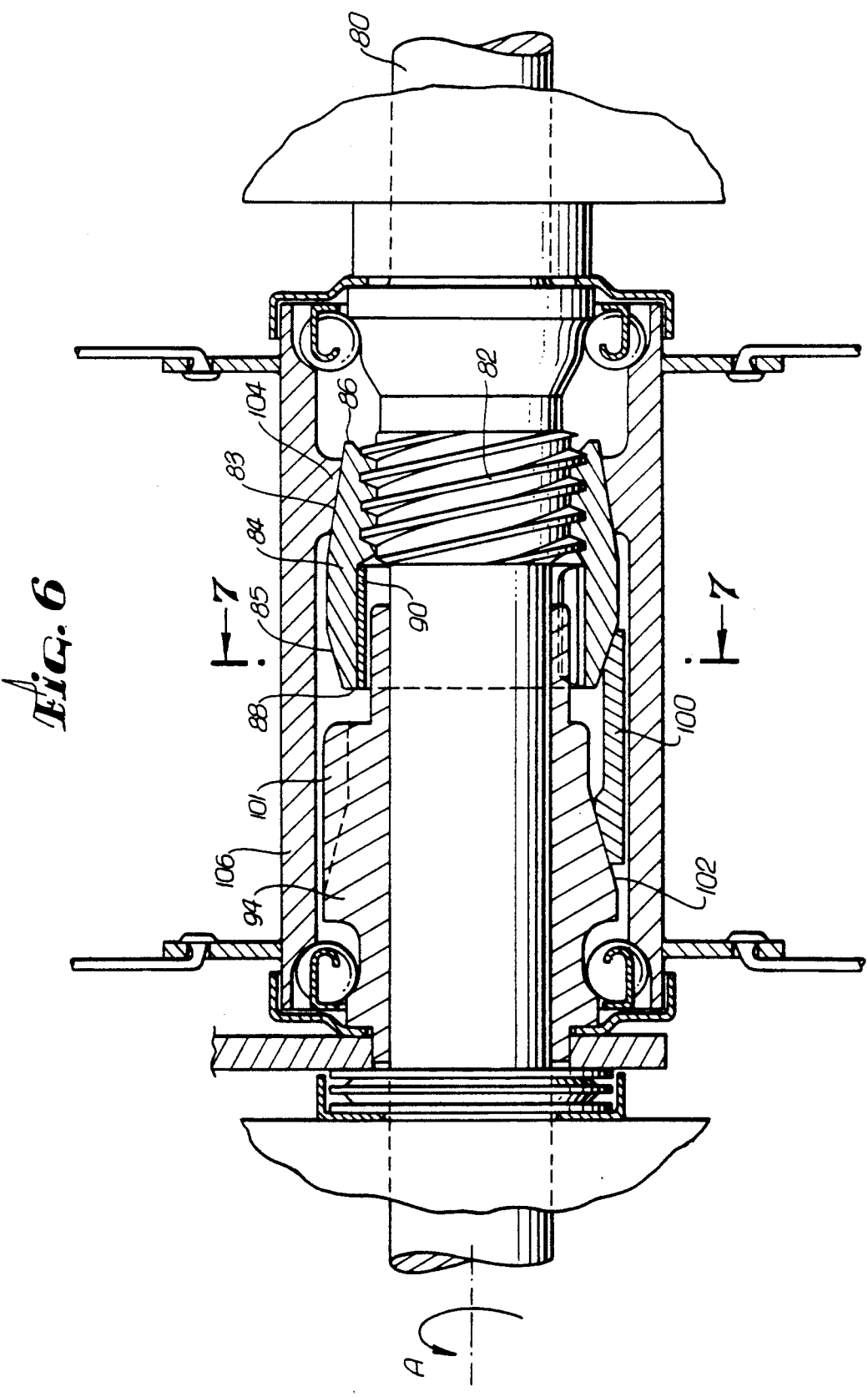
FIG. 6 is a sectional view of a second embodiment of a coaster brake assembly of the present invention.

A second embodiment of the present invention is illustrated in FIGS. 6–8. This embodiment is similar in many respects to the embodiment described above with respect to FIGS. 3–5. A drive shaft 80 is provide with an integral driver 82 having external threads. In this embodiment, the clutch cone 84 has an internal threaded end 86 and an unthreaded end 88, and tapered surfaces 83 and 85. A cylindrical C-shaped spring 90 having a curled end 92 is press fitted into the unthreaded end 88. A brake cone 94 having a smooth axial bore through which the shaft 80 rotates is provided with a portion that slidably extends into the space between the spring 90 and the shaft 80. The brake cone 94 has a slot 96 which receives the curled end 92 of the spring 90. Since the brake cone 94 has a lug 107 which is fitted into hole 108 in the brake reaction lever 109 which in turn is secured to the chassis of the velocipede, the brake cone is prevented from rotary motion the spring 90 with its curled end 92 held in place by the slot 96 on the brake cone in turn retards the clutch cone from rotation during threading. As in the previous embodiment, the spring however allows the clutch cone to rotate slightly to facilitate decoupling of the hub from the shaft during coasting.

Alternating lugs 101, 102 and 103 and tapered surfaces 105 (only one of the tapered surfaces is identified in the figures, the other two tapered surfaces are not visible in the figures) are provided symmetrically on the brake cone 94. Three brake shoes 98, 99 and 100 are disposed circumferentially around the brake cone 94 and the clutch cone 84, separated by lugs 101, 102 and 103. Similar to the previous embodiment, each of the brake shoes has tapered surfaces adapted to engage the clutch cone tapered surface 85 and the brake cone tapered surfaces for camming the brake shoes during braking, and has a convex surface adapted for engaging the inside wall of the hub for braking.

The operation of this embodiment is generally similar to the previous embodiment. When the shaft 80 is rotated in a forward driving direction as indicated by the arrow 'A', the clutch cone 84 which is held from rotation by the spring 90 traverses to the right as it is threaded onto the rotating driver 82. The tapered surface 83 on the clutch cone 84 engages a flange 104 of the hub, thereby coupling the hub to the shaft 80 so as to cause the hub to rotate in the same direction as the shaft 80. When the rotation of the shaft 80 is slowed or stopped, because of the engagement of the flange 104 with the clutch cone tapered surface 83, the clutch cone 84 rotates slightly in the reverse direction to the arrow 'A' against the torsion of the spring 90. As a result, the tapered surface 83 separates from the flange 104, thus decoupling the hub from the shaft thereby allowing the hub to coast in the forward direction.

To apply braking action to the hub, the shaft is rotated in the reverse direction to arrow 'A'. This causes the clutch cone 84 which is held from rotation by the spring 90 to traverse toward the brake cone 94. Because of camming action caused by the interaction of the tapered surfaces of the clutch cone, the brake cone and the brake shoes, the brake shoes move radially outward into frictional engagement with the inside wall of the hub. The forward rotation of the hub is thus retarded and if braking is applied sufficiently long, the hub will eventually stop.

Figure 9:
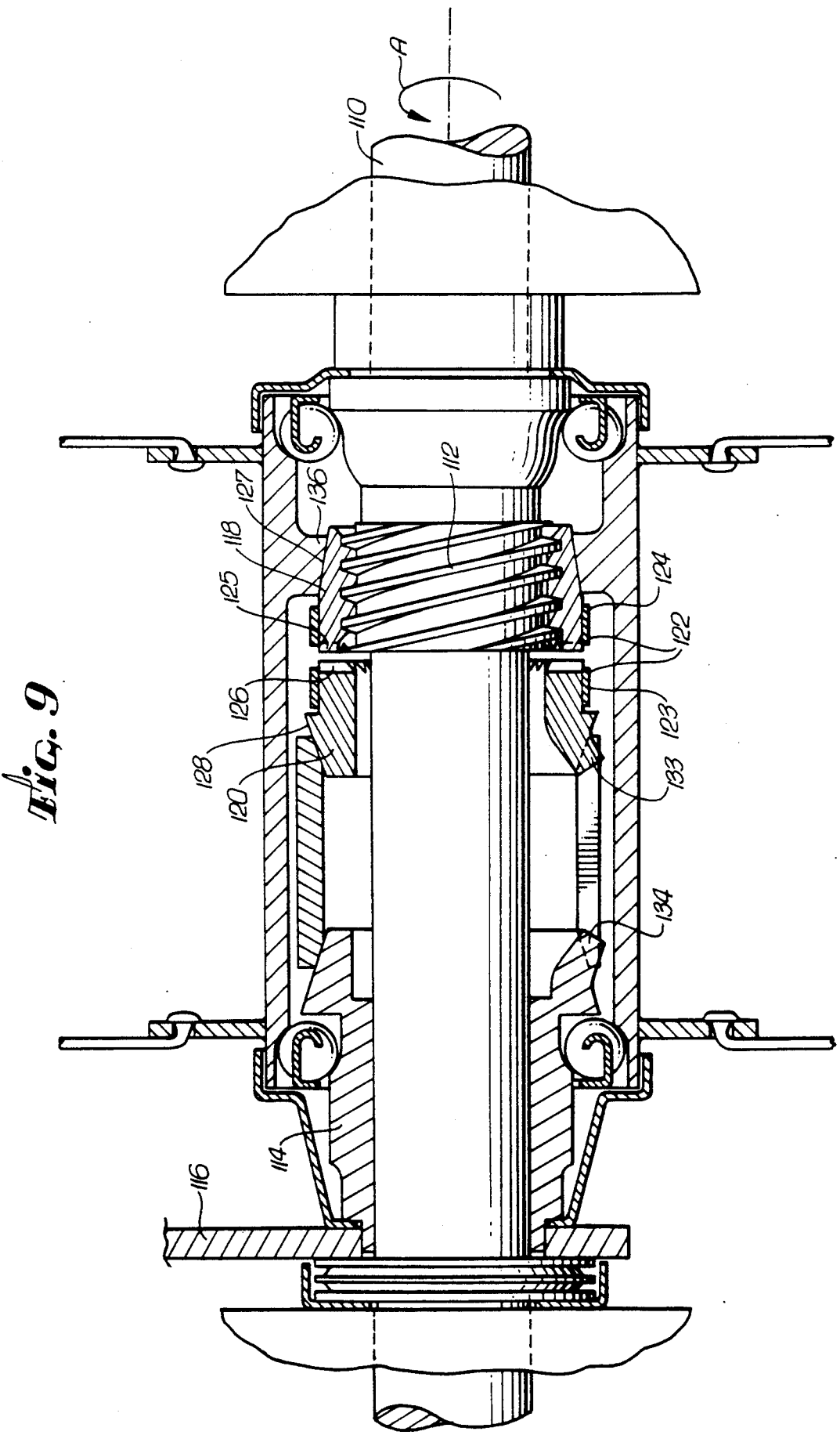
FIG. 9 is a sectional-view of a third embodiment of a coaster brake assembly of the present invention.
Figure 10:
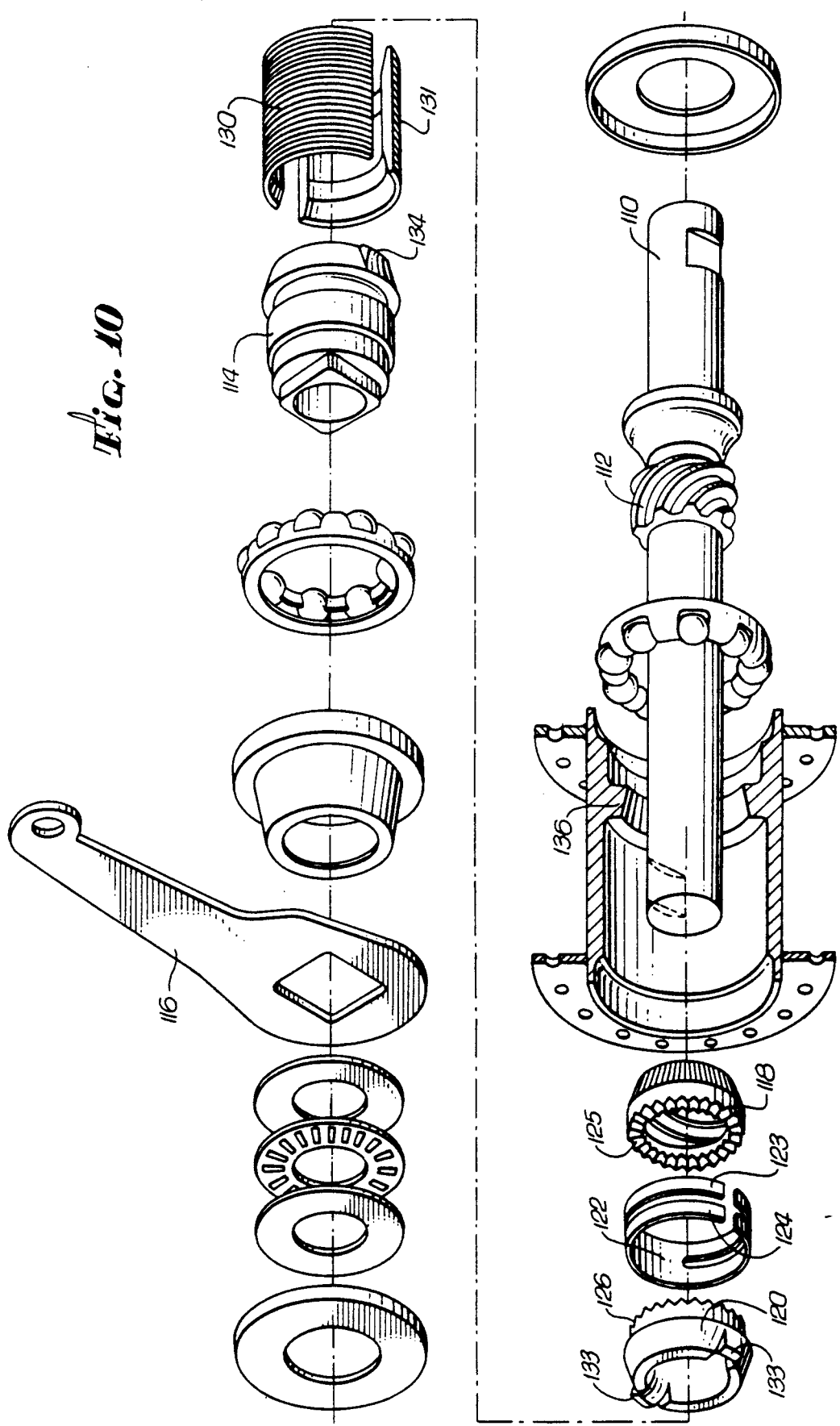
FIG. 10 is an exploded perspective view of the coaster brake assembly of FIG. 9.

A third embodiment of the present invention is shown in FIGS. 9 and 10. Like the previous embodiments, a shaft 110 is provided with an integral threaded driver 112. A brake cone 114 having a smooth axial bore for the shaft is provided, which is prevented from rotary movement by a brake reaction lever 116 in a manner similar to the previous embodiment. A clutch cone is provided which in this embodiment is a combination of two cones sections 118 and 120 coupled by a split sleeve 122. The sleeve 122 aligns the cone sections 118 and 120 axially. The sleeve 122 has portions 123 and 124 which bear frictionally over the periphery of the cone sections to prevent the cone section 118 from rotating during threading as the shaft 110 rotates. The opposing ends 125 and 126 of the cone sections are provided with teeth for positive engagement of the cone sections during braking. The other ends of the cone sections are provided with tapered surfaces 127 and 128 which are adapted to engage the tapered surfaces of brake shoes 130 and 131. The brake shoes are disposed symmetrically and separated from one another by respective lugs 133 and 134 on the clutch cone section 120 and the brake cone 114. The brake cone 114 fixed from rotation by the lugs 134, also prevents the brake shoes 130 and 131 from revolving around the shaft. The clutch cone section 120 is also prevented from rotation by the clutch cone lugs 133 held between the brake shoes.

In the operation of this embodiment, forward driving rotation of the shaft 110, as indicated by arrow 'A', causes the clutch cone section 118 to traverse away from the clutch cone section 120 and toward the flange 136 of the hub as the clutch cone section 118, which is held from rotation by the sleeve 122, threads itself onto the rotating driver 112. The tapered surface of the cone section 118 frictionally engages the flange 136, causing the hub to rotate in the direction of the arrow 'A'. The teeth at the ends 125 and 126 of the cone sections are disengaged during forward rotation of the shaft and hub.

When the rotation of the shaft 110 is slowed or stopped, the cone section 118 continues to rotate slightly in the direction of arrow 'A' by reason of its engagement with the flange 136, thereby unthreading slightly from the driver 112 to disengage from the flange 136. The hub is then free to continue its rotation independently of the shaft 110 in a coasting mode.

To stop or slow the hub from rotation, the shaft 110 is rotated in a direction opposite to the arrow 'A'. The one section 118 traverses toward the cone section 120 as it unthreads from the rotating driver 118, until the teeth on the cone sections mesh. The sleeve 122 maintains the alignment between the cone sections and ensures that the cone sections are not rotated along with the driver. Further backward rotation causes the cone sections to traverse toward the brake cone 114 thereby pushing the brake shoes radially outward toward the inside wall of the hub to retard the rotation of the hub.

Figure 11:
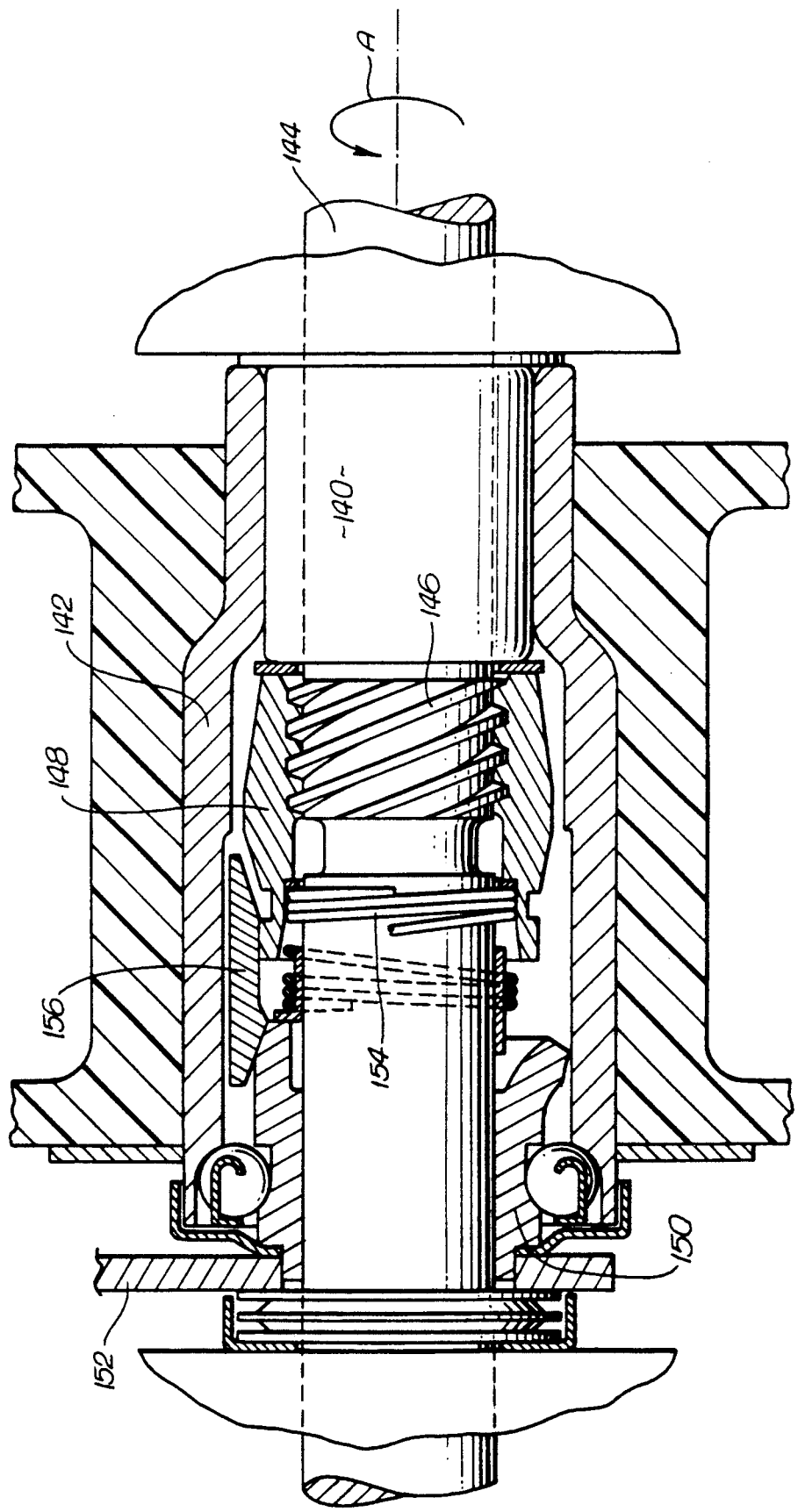
FIG. 11 is a sectional view of a fourth embodiment of a coaster brake assembly of the present invention.

Another embodiment of the present invention is shown in FIG. 11. Instead of engaging a clutch cone tapered surface against an internal flange on the inside wall of the hub, this embodiment makes use of a bearing 140 of the type which permits the drive shaft to couple its rotary motion to the hub in only one direction. FIG. 11 illustrates one example of such "one-way" bearings which are often referred to as "Torrington" roller clutch bearings. The bearing 140 is press fitted into one end of the hub 142 and placed onto a shaft 144. The bearing 140 is attached to the hub in a manner such that the shaft is permitted to rotate with respect to the bearing in the direction opposite to arrow 'A'. The shaft 144 has an integral threaded driver 146 and a clutch cone 148, similar to the first embodiment previously described. The clutch cone tapered surface adjacent the driver 146 however is not used to engage a flange on the hub wall. A brake cone 150 having a smooth axial bore is provided at the other end of hub and is fixed from rotation by a brake reaction lever 152. A helical spring 154 is provided between the brake cone 150 and the clutch cone 148 to facilitate threading action as in the first embodiment. A number of brake shoes 156 are disposed circumferentially and symmetrically around the clutch cone 148 and the brake cone 150.

In operation, forward driving rotation of the shaft 144 in the direction of arrow 'A' causes the bearing 140 to lock. This couples the hub to the shaft so as to cause the hub 142 to rotate in a forward driving direction as the shaft 144 rotates. At the same time, the clutch cone 148 is drawn away from the brake shoes 156 as it threads itself onto the rotating driver 146. The brake shoes 156 disengage from the inside wall of the hub 142 to allow forward rotation of the hub. The spring 154 prevents the clutch cone from rotating along with the rotating driver 146.

When the rotation of the shaft 144 is stopped during coasting mode, the hub continues to rotate in the forward direction indicated by arrow 'A'. Hence, the rotation of the shaft 144 relative to the hub 142 is in a direction opposite to arrow 'A' and the bearing 140 ceases to lock. The hub 142 is decoupled from the shaft 144 and is allowed to rotate independently with respect to the shaft 144.

To apply braking action against the hub 142, the shaft 144 is rotated in a direction opposite to arrow 'A'. Like the first embodiment described with respect to FIGS. 3-5, the clutch cone and the brake cone cooperatively forces the brake shoes against the inside surface of the hub.

Figure 12:
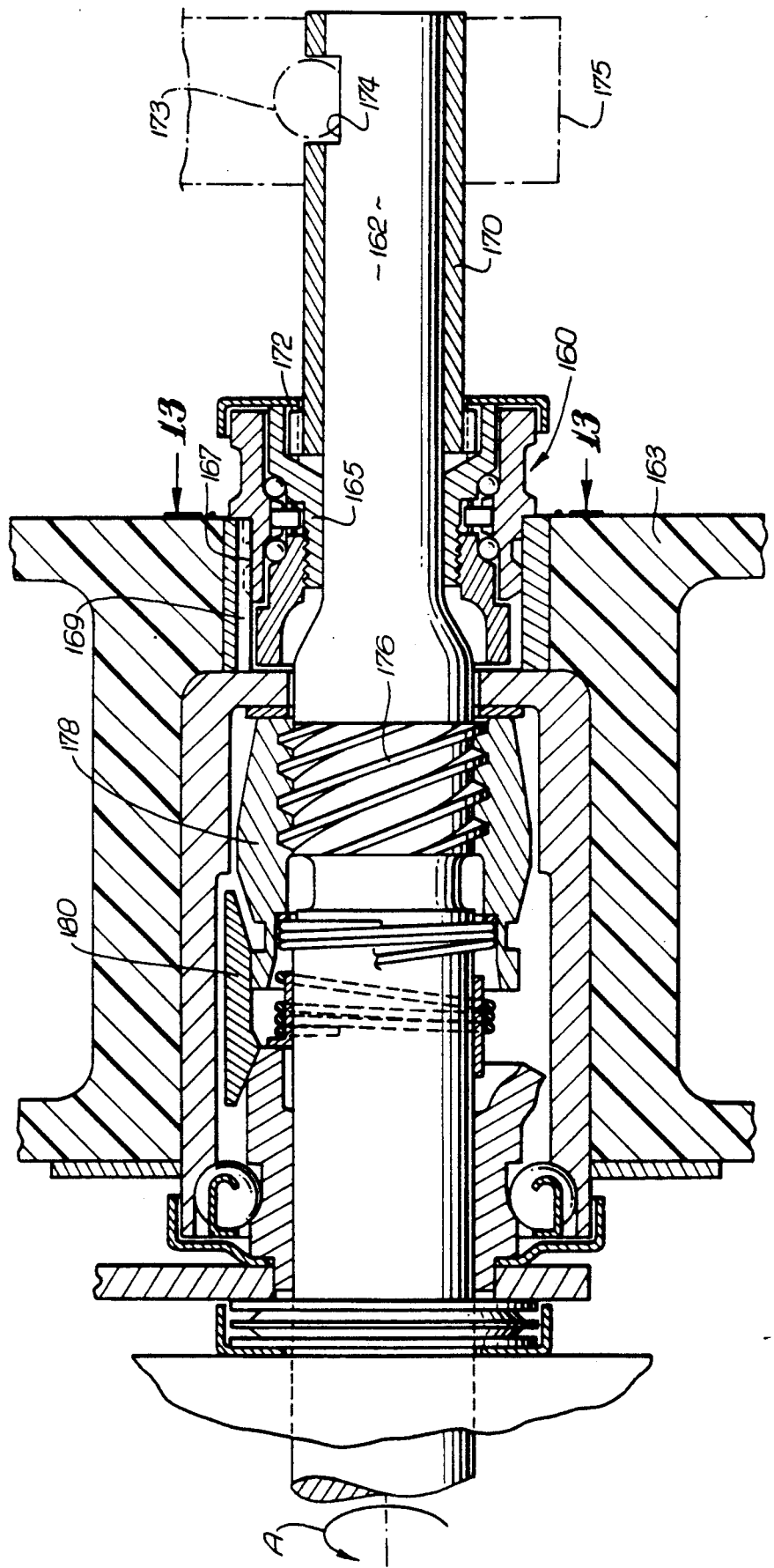
FIG. 12 is a sectional view of a fifth embodiment of a coaster brake assembly of the present invention.
Figure 13:
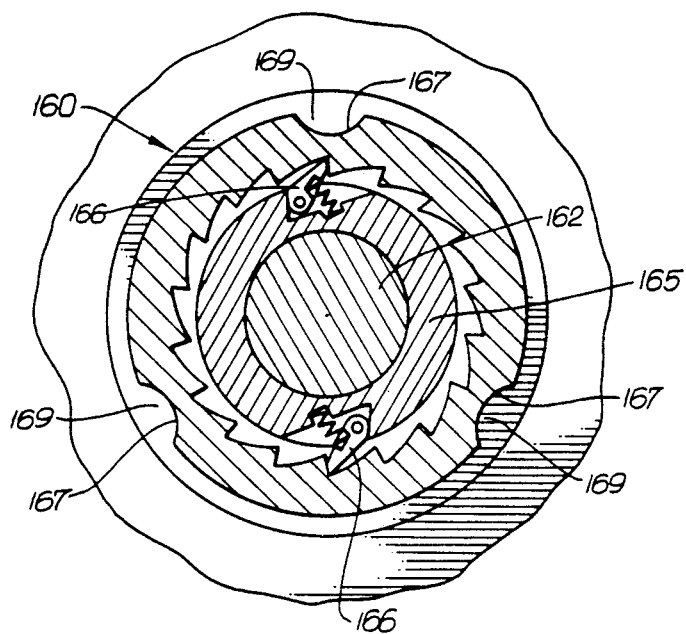
FIG. 13 is a cross-sectional view of the coaster brake assembly of FIG. 12.
Figure 14:
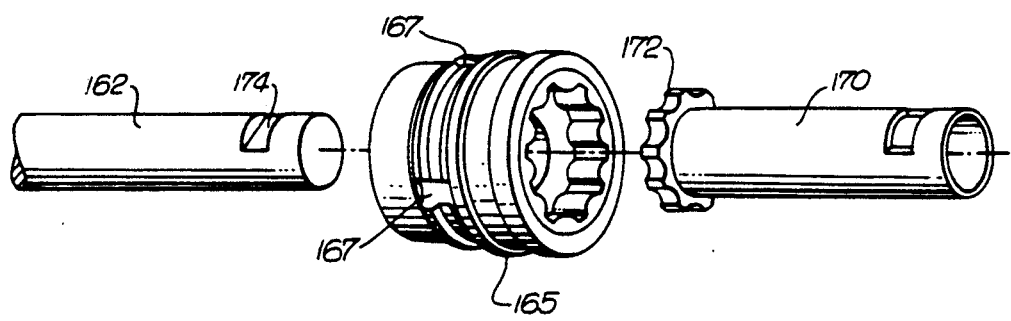
FIG. 14 is an exploded perspective view of a ratchet drive mechanism for use in the coaster brake assembly of FIG. 12.

Yet another embodiment is shown in FIGS. 12-14. In this embodiment, the Torrington clutch bearing 140 in the preceding embodiment is replaced with a ratchet drive mechanism 160. The ratchet 160 couples rotary movement of a shaft 162 to the hub in the forward driving direction indicated by arrow 'A'. The ratchet 160 allows rotation of the shaft 162 relative to the hub 163 in a direction opposite to arrow 'A'.

As shown in FIG. 13, the ratchet drive 160 basically comprises an outer ring 164 and an inner ring 165 coupled by ratchet pawls 166. Referring to FIGS. 12 and 14, the ratchet drive 160 has slots 167 on the periphery of the outer ring 164 which are fitted to lugs 169 at one end of the hub. The inner ring 165 is coaxially fitted over one end of the shaft 162 and coupled to a tube 170 by gears 172. The tube 170 is coaxially fitted over the shaft 162 and fixed in position on the shaft by lug 173 in slot 174. The lug 173 also securely attaches a crank arm 175 to the end of the shaft 162.

When the shaft 162 is rotated in the direction of arrow 'A', the ratchet 160 prevents relative rotation between the hub and the shaft. The hub is thus driven in the forward direction as the shaft 162 rotates. When the shaft 162 is not rotating (or rotating at a slower speed relative to the hub), the hub is free to continue to rotate in the forward driving direction (arrow 'A').

The ratchet mechanism also permits the shaft to rotate relative to the hub when the shaft is rotated backward to brake. The driver 176 causes the clutch cone 178 to engage the brake shoes 180 thereby retarding the forward rotation of the hub with respect to the shaft.

While the invention has been described with respect to the preferred embodiments in accordance therewith, it will be apparent to those skilled in the art that various modifications and improvements may be made without departing from the scope and spirit of the invention. For example, although a three wheeled velocipede has been illustrated, it is recognized that the coaster brake of the present invention may be used with twowheeled and four-wheeled velocipedes. Accordingly, it is to be understood that the invention is not to be limited by the specific illustrated embodiments, but only by the scope of the appended claims.

I claim:

1. A coaster brake assembly comprising:
   a hub which is generally cylindrical having an inside wall;
   a rotatable drive shaft on which the hub is mounted, the drive shaft having a threaded portion integral thereto;

a clutch cone disposed axially along the drive shaft adjacent the threaded portion, the clutch cone having a first tapered surface, an internally threaded portion for threading engagement with the adjacent threaded portion of the drive shaft, and a tapered end having a second tapered surface;

a brake cone having a smooth axial bore through which the drive shaft rotates, the brake cone further having a tapered surface adjacent the second tapered surface of the clutch cone;

a helical spring disposed axially between the brake cone and the clutch cone to urge the clutch cone threaded portion toward the threaded portion of the drive shaft and retard rotation of the clutch cone so that when the shaft is rotated in a first direction, the threaded portions of shaft and the clutch cone thread together and thereafter rotate together;

at least one brake shoe disposed circumferentially around the drive shaft and adjacent the adjacent tapered surfaces of the clutch cone and the brake cone, the brake shoe having a convex surface adapted for frictional engagement with the hub, said brake shoe being provided with tapered surfaces adapted for cam engagement with the adjacent tapered surfaces of the clutch cone and the brake cone;

coupling means for coupling the rotation of the drive shaft-driven first clutch cone tapered surface and the hub, in a forward driving direction wherein the coupling means comprises a flange provided on the inside wall of the hub and the first tapered surface provided on the clutch cone adjacent the threaded portion of t he drive shaft which is adapted to engage the flange to couple the drive shaft to the hub in the forward driving rotation of the drive shaft so as to cause the hub to rotate in the same direction;

a brake cone provided with lugs on its tapered surface for preventing the brake shoe from revolving about the drive shaft when the convex surface of the rake shoe frictionally engages the inside wall of the hub; and a brake reaction lever which is secured from rotary motion, the brake reaction lever being attached to the brake cone and defines a hole through which the drive shaft passes.

2. A coaster brake assembly as in claim 1 wherein the hole on the brake reaction lever is a circular hole having at least one cutout around its periphery, and the brake cone has a lug fitted through the cutout such that the brake cone is prevented from rotary motion with respect to the brake reaction lever.

3. A coaster brake assembly as in claim 2 wherein the clutch cone has a generally cylindrical structure having the second tapered end for cam engagement with the tapered surface of the brake shoe and the first tapered surface adapted to engage the flange on the inside wall of the hub.

4. A coaster brake assembly comprising:
a hub which is generally cylindrical having an inside wall;
a rotatable drive shaft on which the hub is mounted, the drive shaft having a threaded portion integral thereto;
a clutch cone disposed axially along the drive shaft adjacent the threaded portion, the clutch cone having a first tapered surface, an internally threaded portion for threading engagement with the adjacent threaded portion of the drive shaft, and a tapered end having a second tapered surface;

a brake cone having a smooth axial bore through which the drive shaft rotates, the brake cone further having a tapered surface adjacent the second tapered surface of the clutch cone;

a helical spring disposed axially between the brake cone and the clutch cone to urge the clutch cone threaded portion toward the threaded portion of the drive shaft and retard rotation of the clutch cone so that when the shaft is rotated in a first direction, the threaded portions of shaft and the clutch cone thread together and thereafter rotate together;

at least one brake shoe disposed circumferentially around the drive shaft and adjacent the adjacent tapered surfaces of the clutch cone and the brake cone, the brake shoe having a convex surface adapted for frictional engagement with the hub, said brake shoe being provided with tapered surfaces adapted for cam engagement with the adjacent tapered surfaces of the clutch cone and the brake cone; and coupling means for coupling the rotation of the drive shaft-driven first clutch cone tapered surface and the hub, in a forward driving direction, wherein the coupling means is a clutch bearing fitted between the drive shaft and the inside wall of the hub, wherein the clutch bearing couples to the hub the rotary movement of the drive shaft in the forward driving direction so as to cause the hub to rotate in the same direction, and wherein the clutch bearing decouples the hub from the drive shaft in a reverse driving direction to allow the drive shaft to rotate independently of the drive shaft.

5. A velocipede comprising:
a front wheel having a hub which is generally cylindrical with an inside wall;
a rotatable drive shaft on which the hub is mounted, the drive shaft having a threaded portion integral thereto;
a crank arm connected to each end of the drive shaft for rotating the drive shaft;
a clutch cone disposed axially along the drive shaft adjacent the threaded portion, the clutch cone having a first tapered surface, an internally threaded portion for threading engagement with the adjacent threaded portion of the drive shaft, and a tapered end having a second tapered surface;

a brake cone having a smooth axial bore through which the drive shaft rotates, the brake cone further having a tapered surface adjacent the tapered surface of the clutch cone;

a helical spring disposed axially between the brake cone and the clutch cone to urge the clutch cone threaded portion toward the threaded portion of the drive shaft and to retard rotation of the clutch cone so that when the drive shaft is rotated in a first direction, the threaded portions of the drive shaft and the clutch cone thread together, causing the clutch cone first tapered surface to engage the internal wall of the front wheel hub and thereafter the drive shaft rotation ally drives the clutch cone and the front wheel hub in the first direction; and at least one brake shoe disposed circumferentially around the drive shaft and adjacent the tapered surfaces of the clutch cone and the brake cone, the brake shoe having a convex surface adapted for frictional engagement with the hub, said brake shoe being provided with tapered surfaces adapted for cam engagement with the tapered surfaces of the clutch cone, and the brake cone.

* * * * *